(12) United States Patent
Liou

(10) Patent No.: US 7,441,734 B2
(45) Date of Patent: Oct. 28, 2008

(54) VEHICLE-USED SUCTION DISK RETAINER

(75) Inventor: Chii-Moon Liou, Taipei Hsien (TW)

(73) Assignee: Haicom Electronics Corp., Jhonghe, Taipei County (TW)

( * ) Notice: Subject to any disclaimer, the term of this patent is extended or adjusted under 35 U.S.C. 154(b) by 178 days.

(21) Appl. No.: 11/396,513

(22) Filed: Apr. 4, 2006

(65) Prior Publication Data

US 2007/0228752 A1    Oct. 4, 2007

(51) Int. Cl.
*A45D 42/14* (2006.01)
(52) U.S. Cl. ............... 248/205.5; 248/206.2; 248/676; 248/683; 248/921
(58) Field of Classification Search ... 248/205.5–205.8, 248/206.1, 206.2, 683, 362, 363, 309.3, 292.12, 248/676, 917, 919–921; 294/64.1–64.3
See application file for complete search history.

(56) References Cited

U.S. PATENT DOCUMENTS

| | | | | |
|---|---|---|---|---|
| 1,877,570 A | * | 9/1932 | Fitz Gerald | ............... 211/69.7 |
| 6,027,257 A | * | 2/2000 | Richards et al. | ............. 396/428 |
| 6,663,064 B1 | * | 12/2003 | Minelli et al. | ............ 248/205.5 |
| 6,913,232 B2 | * | 7/2005 | Richter | .................... 248/205.8 |
| 7,021,593 B1 | * | 4/2006 | Fan | .......................... 248/206.2 |
| 2004/0178647 A1 | * | 9/2004 | Chen | ......................... 294/64.1 |
| 2007/0215298 A1 | * | 9/2007 | Chen | ..................... 160/370.21 |

* cited by examiner

Primary Examiner—Korie H. Chan

(57) ABSTRACT

A vehicle-used suction disk retainer has a seat. The seat is installed with a suction disk and a buckling seat which are connected as an integral body. An adjusting sheet is installed in an embedding groove of the seat. As the retainer is used in a car, when the adjusting sheet is moved, the buckling seat has a force to pull a part of the suction disk to move downwards and the suction disk presses downwards. Thereby the upper and lower forces are fixed. When a reverse action is applied, it can be pulled up from the ear. Thereby the retainer can be fixed, which can be used to place a device, such as a PDA32. Furthermore, the retainer is compact, light and small volume and thus it is portable and usable.

2 Claims, 7 Drawing Sheets

VEHICLE-USED SUCTION DISK RETAINER

FIELD OF THE INVENTION

The present invention relates to retainers, and in particular to a vehicle-use suction disk retainer, which is compact, light and small volume and thus it is portable and usable.

BACKGROUND OF THE INVENTION

The prior art vehicle-used suction disk retainer is a box seat or a groove seat with a suction disk for being attaching to a glass or a smooth surface. Then object, such as a PDA is placed upon the suction disk. However the prior art has some defects, such as a complicated structure, a high molding cost and the assembly work is tedious. Thereby, the bad product ratio is high. The retainer cannot be attached on the surface for a long time. All these problems are necessary to be improved.

SUMMARY OF THE INVENTION

Accordingly, the primary object of the present invention is to provide a vehicle-used suction disk retainer, wherein the seat is installed with a suction disk and a buckling seat which are connected as an integral body. An adjusting sheet is installed in an embedding groove of the seat. As the retainer of the present invention is used in a car, when the adjusting sheet is moved, the buckling seat has a force to pull a part of the suction disk to move downwards and the suction disk presses downwards. Thereby the upper and lower forces are fixed. When a reverse action is applied, it can be pulled up from the ear. Thereby the retainer can be fixed, which can be used to place a device, such as a PDA 32.

Furthermore, the present invention is compact, light and small volume and thus it is portable and usable.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
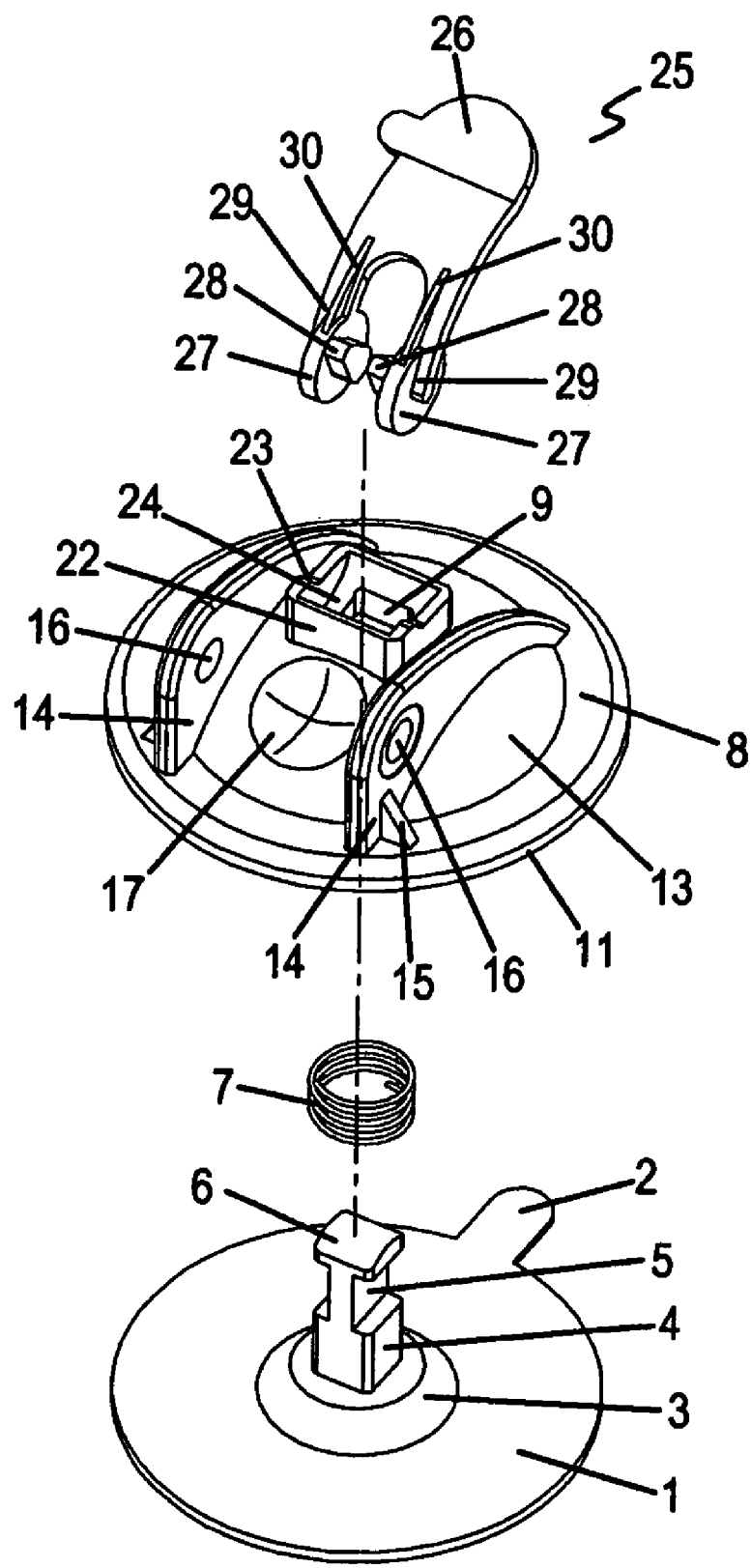
FIG. 1 is an exploded view of the present invention.
Figure 2:
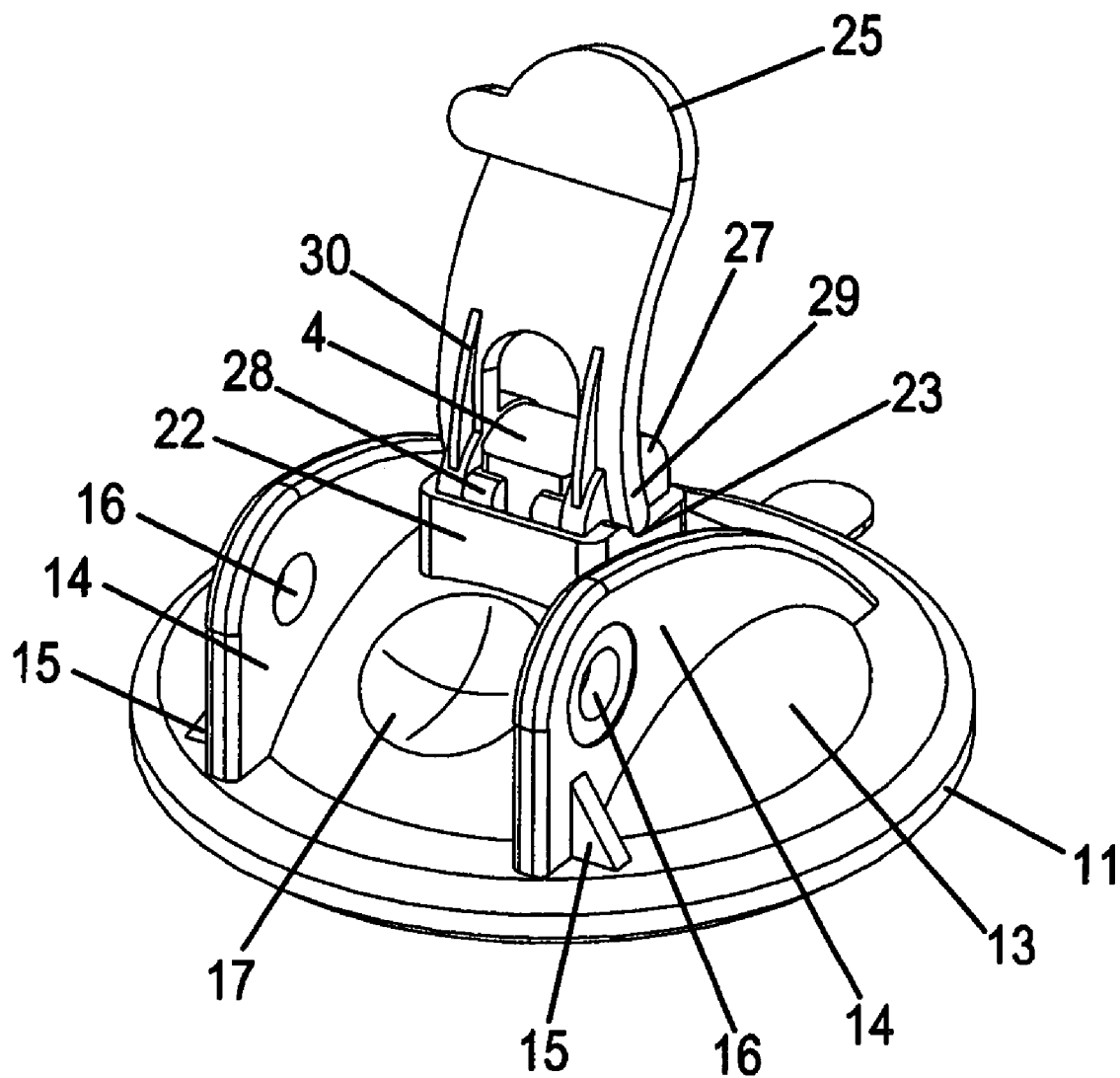
FIG. 2 is an assembled view of the suction disk of the present invention.
Figure 3:
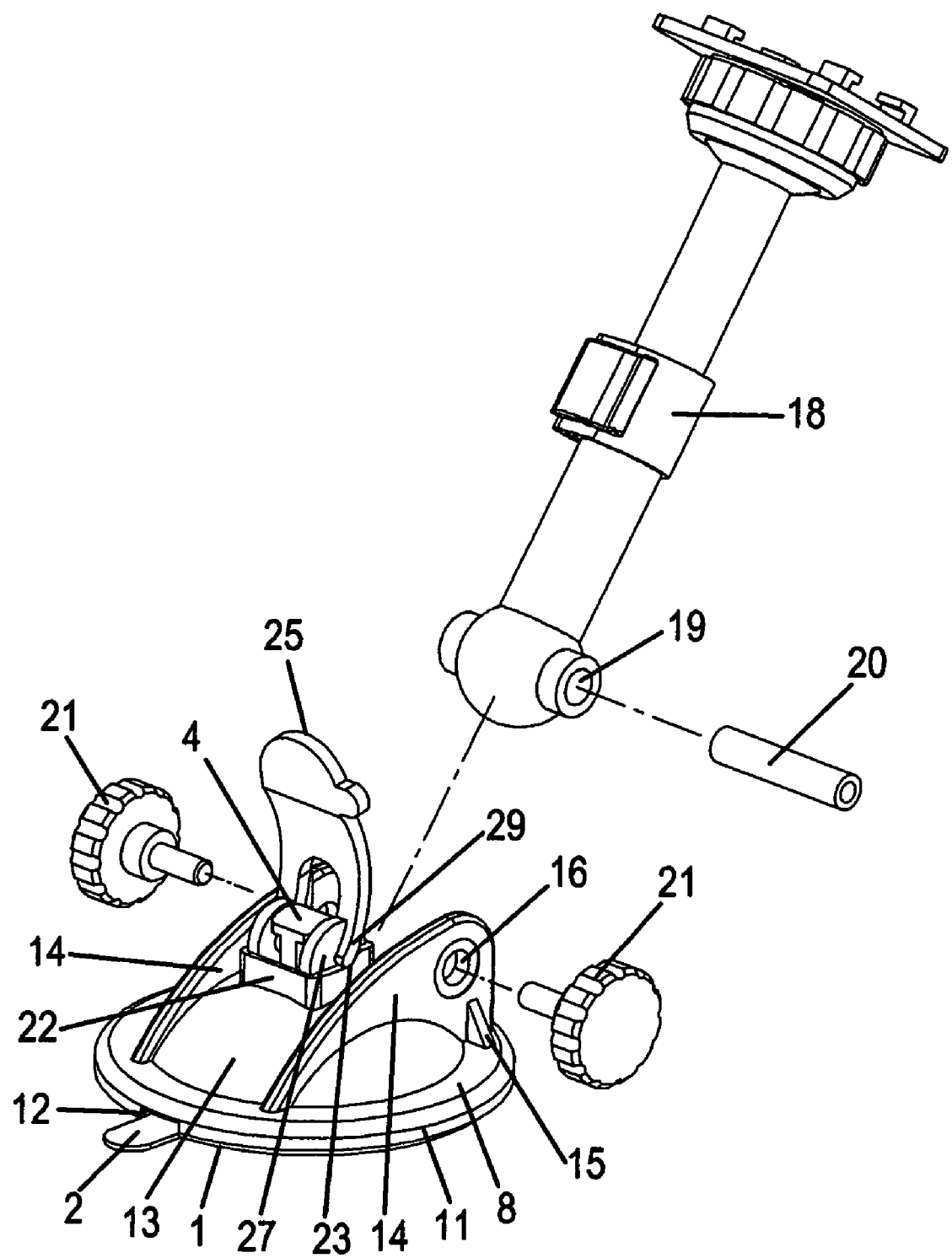
FIG. 3 shows the position of the supporting frame of the present invention.

Referring to FIGS. 1, 2 and 3, the vehicle-used suction disk retainer of the present invention is illustrated. The present invention has the following elements.

The suction disk 1 is a compressible soft round sheet. An ear 2 protrudes from an edge thereof. A center of the suction disk 1 is formed with a cambered base 3. A buckling seat 4 extends from the cambered base 3. Two sides of the buckling seat 4 have two recesses 5. A top surface of the buckling seat 4 is a convex cambered surface 6.

A seat 8 has an annular flange 11 protruding from a lower portion thereof. A notch 12 is formed in the annular flange 11 for receiving a pull ear 2 of the suction disk 1 (referring to FIG. 3). A center of the seat 8 is protruded with a convex cambered surface 13 and two symmetric buckling frames 14. The two buckling frames 14 extend from the convex cambered surface 13 and at two sides thereof. An outer side of each buckling frame 14 has an enhancing rib 15. Each buckling frame 14 has a through hole 16 at an upper side of the enhancing rib 15. The convex cambered surface 13 has a supporting groove 17 between the two buckling frames 14.

Figure 4:
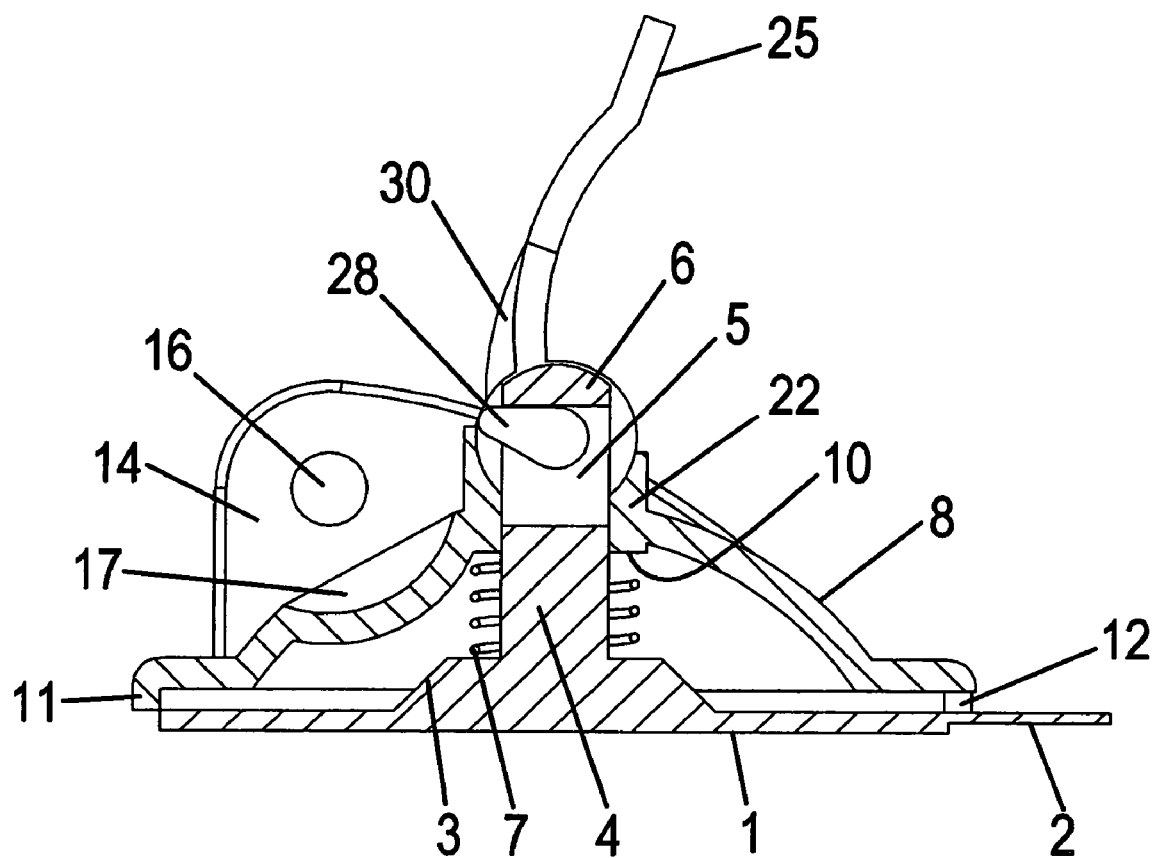
FIG. 4 is a cross sectional view about of the operation of the present invention, where the driving portion is not moved.

A supporting frame 18 is supported on the seat 8. A lower side of the supporting frame 18 has a through hole 19 for receiving a sleeve 20. In assembly, each pin 21 passes through the through hole 16 and the sleeve 20 so as to fix the supporting frame 18 to the seat 8. The convex cambered surface 13 is formed with an embedding groove 9 between the two buckling frames 14. The embedding groove 9 penetrates through the convex cambered surface 13. The buckling seat 4 enclosed by the spring 7 is installed in the embedding groove 9 (referring to FIG. 4). A body 22 protrudes from the embedding groove 9, which is a rectangular wall. Each of two opposite sides of the body 22 has a triangular slot 23. An inner side of the body 22 is formed as a concave cambered groove 24.

An adjusting sheet has a driving portion 26 at a top thereof. A front end of the adjusting sheet 25 has two round sheets 27 which resist against one surface of the concave cambered groove 24. Each inner side of the two round sheets 27 is protruded with a projections 28. The two projections 28 are detachably buckled into the two recesses 5 of the buckling seat 4. Each of two lateral lower sides of the adjusting sheet 25 aside the round sheet 27 is positioned upon the triangular slot 23. Two enhancing ribs 30 are installed on the adjusting sheet 25 for increasing the structural strength of the round sheets 27.

Figure 5:
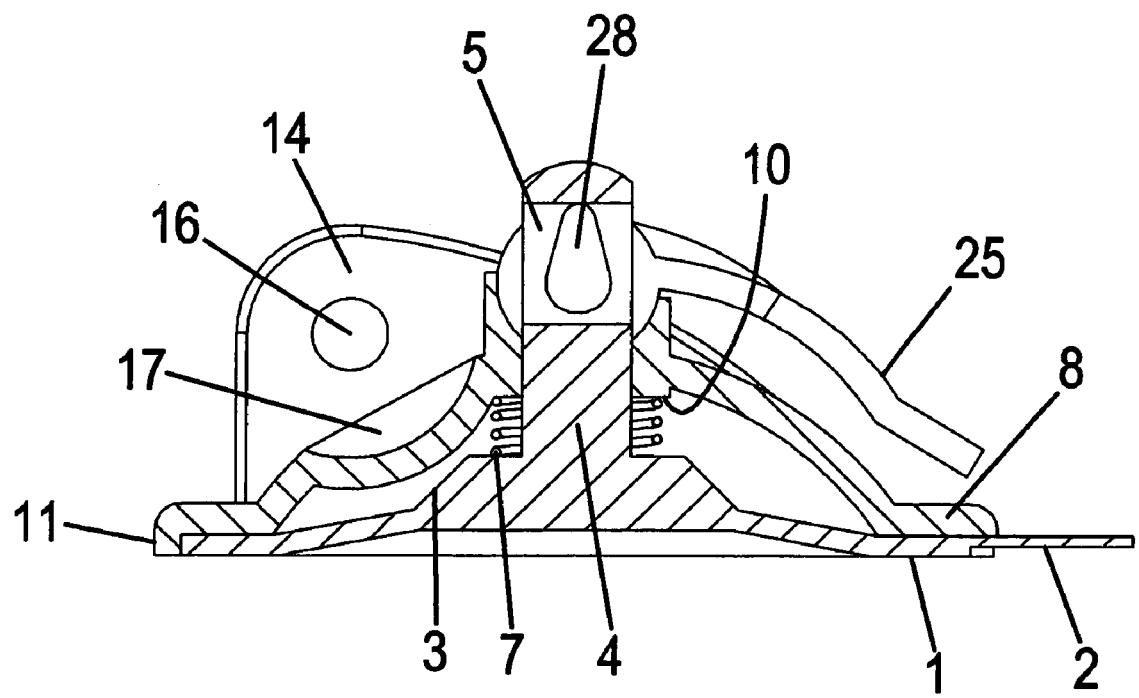
FIG. 5 is a cross sectional view about of the operation of the present invention, where the driving portion is moved.
Figure 6:
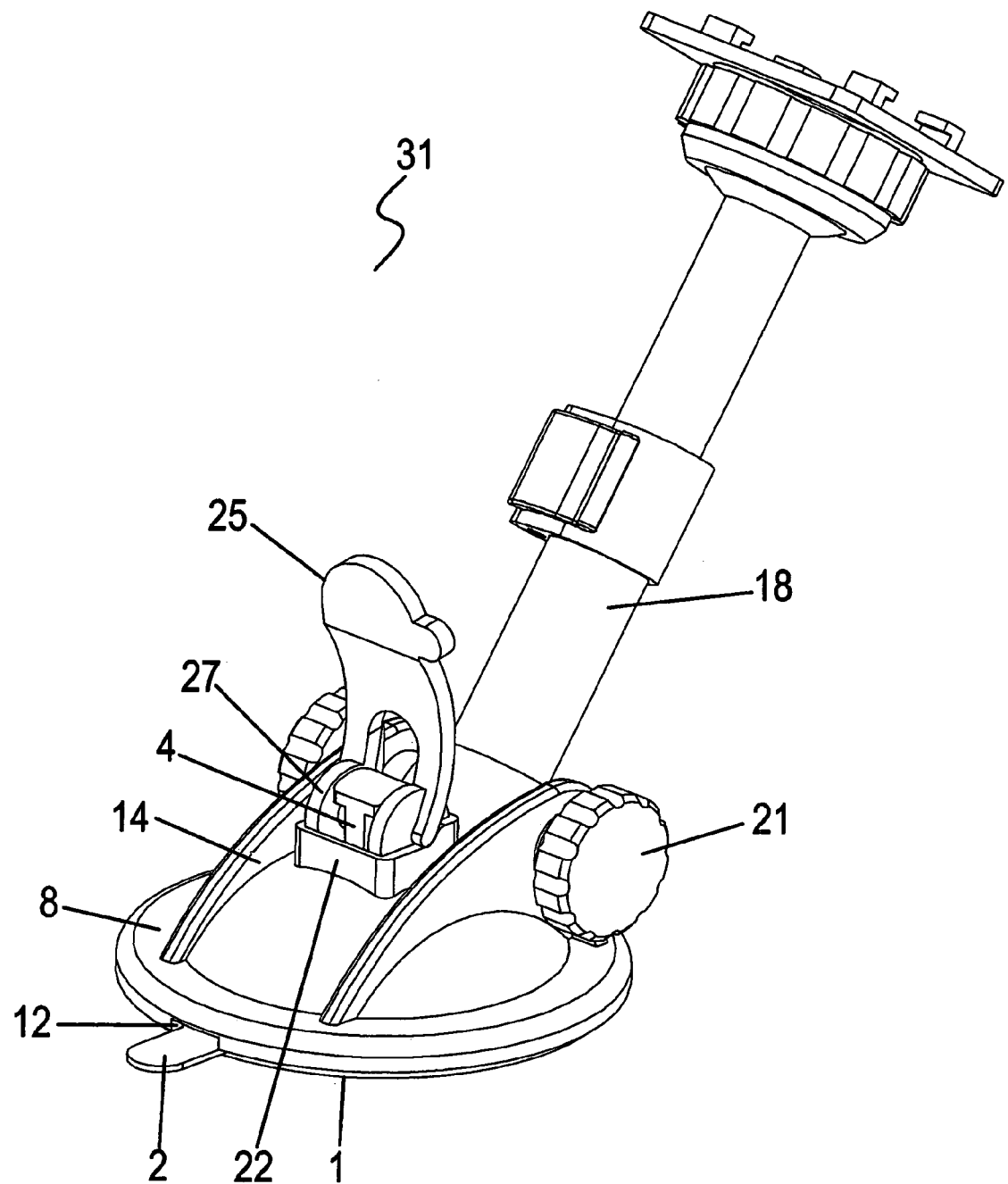
FIG. 6 shows the embodiment of the supporting frame of the present invention.
Figure 7:
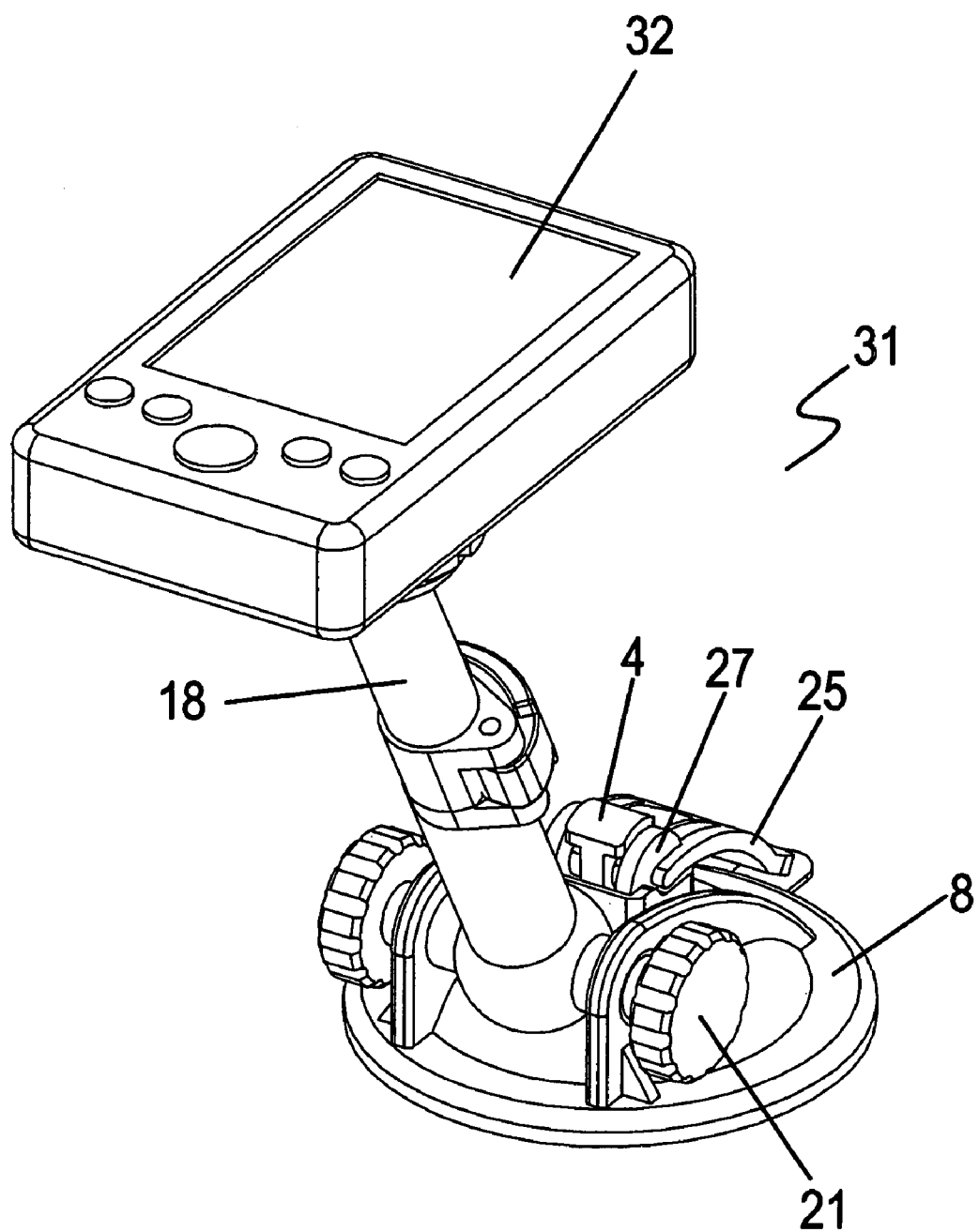
FIG. 7 shows the use of the present invention, where a PDA is placed upon the retainer of the present invention.

As the retainer 31 of the present invention is used in a car, when the adjusting sheet 25 is moved, the buckling seat 4 has a force to pull a part of the suction disk 1 to move downwards (referring to FIGS. 4 and 5) and the suction disk 1 presses downwards. Thereby the upper and lower forces are fixed. When a reverse action is applied, it can be pulled up from the ear 2. Thereby the retainer 31 can be fixed (referring to FIGS. 6 and 7), which can be used to place a device, such as a PDA 32. Furthermore, the present invention is compact, light and small volume and thus it is portable and usable.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vehicle-used suction disk retainer comprising:
  a suction disk being a compressible soft round sheet; an ear protruding from an edge thereof; a center of the suction disk being formed with a cambered base; a buckling seat extending from the cambered base; two sides of the buckling seat having two recesses; a top surface of the buckling seat being a first convex cambered surface;

a seat having an annular flange protruding from a lower portion thereof; a notch being formed in the annular flange for receiving a pull ear of the suction disk; a center of the seat being protruded with a second convex cambered surface and two symmetric buckling frames; the two buckling frames extending from the second convex cambered surface and at two sides thereof; an outer side of each buckling frame having an enhancing rib; each buckling frame having a through hole at an upper side of the enhancing rib; and the second convex cambered surface having a supporting groove between the two buckling frames;

a supporting frame being supported in the seat; a lower side of the supporting frame having a through hole for receiving a sleeve; a pin passing through the through hole and the sleeve so as to fix the supporting frame to the seat; the convex cambered surface being formed with an embedding groove between the two buckling frames; the embedding groove penetrating through the second convex cambered surface; the buckling seat enclosed by the spring being installed in the embedding groove; a body protruding from the embedding groove, which is a rectangular wall; each of two opposite sides of the body having a triangular slot; an inner side of the body being formed as a concave cambered groove;

an adjusting sheet having a driving portion at a top thereof; a front end of the adjusting sheet having two round sheets which resist against one surface of the concave cambered groove; each inner side of the two round sheets being protruded with a projection; the two projections being detachably buckled into the two recesses of the buckling seat; each of two lateral lower sides of the adjusting sheet extending from a side each of the round sheet being positioned upon the triangular slot.

2. The vehicle-used suction disk retainer as claimed in claim 1, wherein two enhancing ribs are installed on the adjusting sheet for increasing the structural strength of the round sheets.

\* \* \* \* \*